United States Patent Office 2,817,732
Patented Dec. 24, 1957

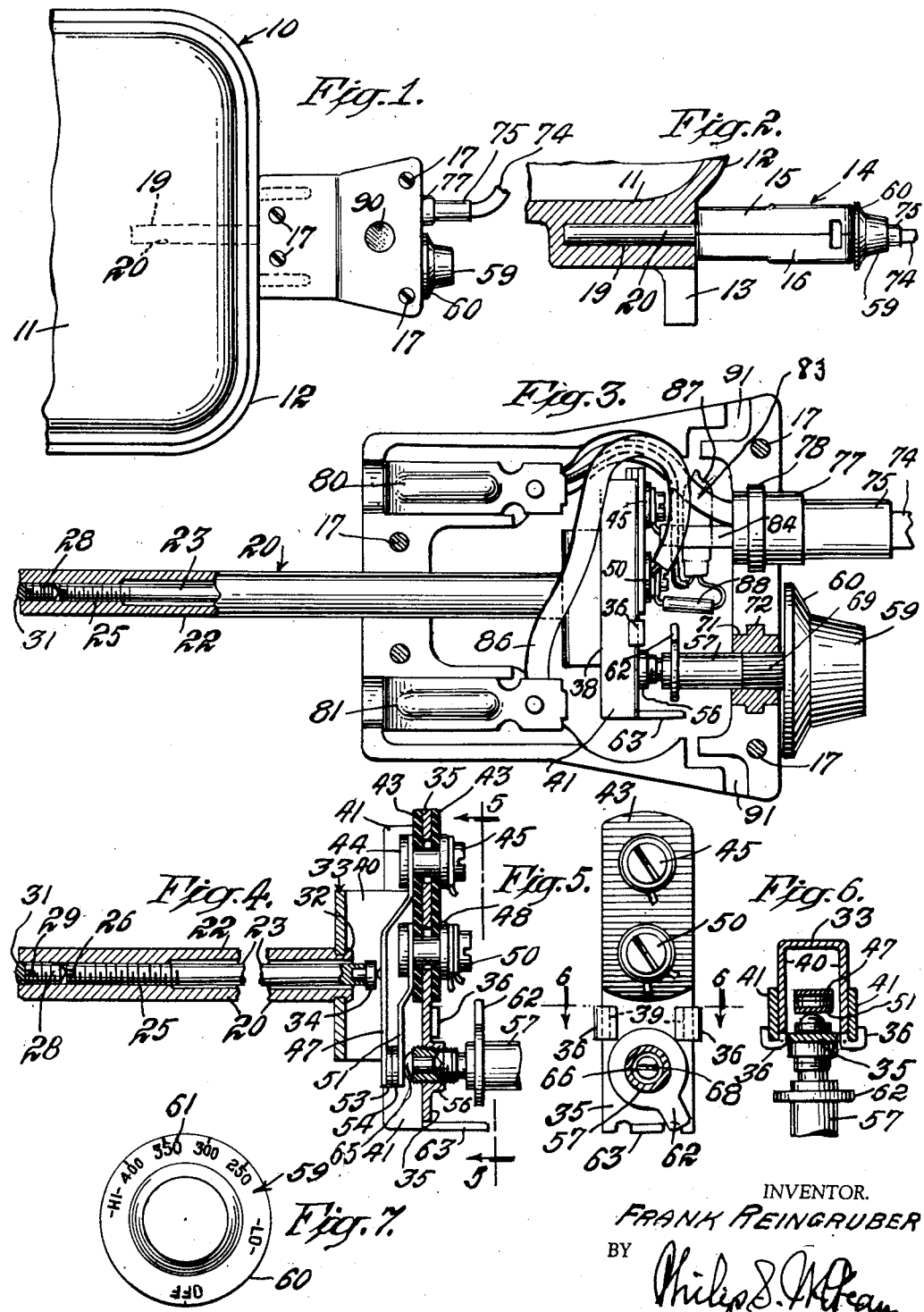

2,817,732

SEPARABLE THERMOSTATIC CONTROL FOR COOKING UTENSILS

Frank Reingruber, Jackson, N. H.

Application November 14, 1956, Serial No. 622,153

3 Claims. (Cl. 200—137)

The present invention relates to adjustable thermostatic controls for electrical appliances on the order of cooking utensils, the thermostatic control being readily detachable to permit unrestricted washing and scouring of the cooking vessel.

The structure and arrangement of the electrical control contacts and the manually adjustable regulator for varying the temperature range are similar to those disclosed in Patent No. 2,703,832, issued on March 8, 1955, to Frank Reingruber and Joseph Reingruber.

In the present invention, means are provided for inserting the temperature sensitive element of the control in a thermometer well formed in the cooking vessel while simultaneously establishing an electrical connection with the heating element. The control may be readily detached from the cooking vessel, so that the vessel may be soaked in water, scoured, washed or otherwise kept cleaned without danger of injury to the thermostatic control.

An object of the invention is to provide means for calibrating and locking the adjustment of the temperature sensitive immersion element prior to its assembly in the thermostatic control, whereby standardization of the temperature sensitive elements is obtained for facilitating quantity production and assembly of the controls.

A further object of the invention is the provision of a temperature sensitive element comprising a hollow tube having a high thermal coefficient of expansion and a substantially non-expansive rod disposed within the hollow tube.

Still another object of the invention is the provision of a compact control which may be readily attached to or detached from a cooking vessel while at the same time providing a high thermal conductivity between the vessel and the temperature sensitive element of the control.

Other objects, features and advantages of the invention will become apparent upon reading the following specification together with the accompanying drawing forming a part hereof.

Referring to the drawing:

Fig. 1 is a plan view showing a fragment of a cooking vessel with a thermostatic control embodying the invention connected to supply thermostatically controlled electrical energy to the vessel for maintaining a predetermined desired cooking temperature within the vessel.

Fig. 2 is a fragmentary view in front elevation showing the cooking vessel in vertical section.

Fig. 3 is an enlarged plan view showing the control removed from the cooking vessel, one of the outer cover halves of the control being removed and the temperature sensitive element being broken away to illustrate details of construction.

Fig. 4 is further enlarged view in plan section showing the thermostatically controlled electrical contacts and portions of the manually adjustable temperature regulating means.

Fig. 5 is en end view, partially in section taken along the line 5—5 of Fig. 4.

Fig. 6 is a fragmentary sectional view in side elevation taken along the line 6—6 of Fig. 5.

Fig. 7 is an end view showing a control knob with a calibrated dial used for manual adjustment of the cooking temperature.

In Fig. 1 of the drawing there is shown an electrically heated cooking vessel 10, illustratively indicated as a flat rectangular griddle. The griddle 10 comprises a central flat portion 11 defining a cooking area surrounded by a retaining rim 12. The griddle 10 is provided with the usual supporting feet 13 (Fig. 2) and a heating element (not shown) hermetically sealed within the griddle. The heating element is connected in conventional manner to a pair of projecting prong terminals (not shown) which are electrically insulated from the metal body of the griddle 10.

The control comprises a bipartite body or cover 14 formed of individual cooperating halves 15 and 16. The cover halves 15 and 16 are formed of suitable heat-resistant electrical insulating material and are illustratively shown of such construction that they may conveniently be produced by molding. The cover halves 15 and 16 are secured together by screw and nut fastening means 17.

The cooking vessel 10 has a cylindrical thermometer well 19 formed therein. The thermostatic control is provided with an elongated cylindrical temperature sensitive element designated generally as 20 which is slidably received in the thermometer well 19 for response to the temperature prevailing at the flat portion 11 of the griddle 10. The sliding fit between the thermometer well 19 and the temperature sensitive element 20 is desirably a close fit such that there is thermally conductive mechanical contact between the side wall of the well 19 and the lateral surface of the temperature sensitive element 20.

Referring to Figs. 3 and 4, the temperature sensitive element 20 comprises a hollow cylindrical tube 22 formed of metal having a high temperature coefficient of expansion, such as brass, for example. Disposed within the tube 22 is a rod 23 formed of a material, such as nickel, steel, or ceramic, having a temperature coefficient of expansion which is substantially zero, or at least sufficiently low to be negligible. The tube 22 is interiorly threaded at 25 adjacent to its free end. The outer end of rod 23 is in threaded engagement with the threaded portion 25 of tube 22. The threaded end of rod 23 has a key slot 26 formed therein to receive the blade of a screwdriver. There is a lock screw 28 provided with a key slot 29, the lock screw 28 being tightened against the threaded end of the rod 23 to prevent the rod 23 from turning. A drop of solder 31 secures the lock screw 28 permanently positioned after final adjustment, as hereinafter described.

As shown in Fig. 4, the inner end of the tube 22 is headed over at 32 whereby it is fixedly secured in a channel-shaped supporting member 33. A contact-actuating insulating button 34 is disposed at the free end of rod 23 within the channel-shaped member 33. The channel-shaped member 33 is secured to a laterally flanged base plate 35 by bent over ears 36. The ears 36 are integrally formed with the spaced parallel edges 38 of the channel-shaped supporting member 33 and extend through cooperating slots 39 formed in the base plate 35, the ears 36 being originally straight and bent over during assembly to hold the base plate 35 and channel-shaped supporting member 33 permanently and securely fastened together. When the base plate 35 and the channel-shaped member 33 are assembled together, the spaced side walls 40 of the channel-shaped member 33 are snugly received between the flanges 41 of the base plate 35.

A pair of insulating plates 43 are mounted on opposite sides of the base plate 35. An interiorly threaded rivet-type terminal 44 extends between the insulating plates 43 and through the base plate 35 being electrically insulated from the base plate 35. At one side of the base plate 35, the terminal 44 is provided with a terminal screw 45. At the other side, the terminal 44 secures a contact spring 47 fixedly against one of the insulating plates 43. A similar rivet-type terminal 48, provided with a terminal screw 50, secures another contact spring 51 against one of the insulating plates 43 like the contact spring 47. At their free ends, the contact springs 47 and 51 carry cooperating electrical contacts 53 and 54, respectively. The contact springs 47 and 51 are spaced apart from each other and electrically insulated from each other. The electrical contacts 53 and 54 are serially included in an energizing circuit for the heater element of the vessel 10, later to be described.

There is an interiorly threaded struck up boss 56 formed in base plate 35. A temperature adjustment shaft 57 has one end in threaded engagement with the boss 56. The other end of temperature adjustment shaft 57 extends outside the insulating body 14 of the control and is fitted with an adjustment knob 59. The knob 59 comprises a skirt or flange 60 upon which a calibrated scale 61 (Fig. 7) is marked. Rotation of the temperature adjustment shaft 57 is limited by a stop arm 62 fixedly mounted on the shaft 57 which cooperates with a lug 63 integrally formed with the base plate 35. The lug 63 may be straight and may conveniently be bent into its active position, as shown, after the adjustment shaft 57 has been screwed into its operating position in the boss 56.

At its exteriorly threaded end, the temperature adjustment shaft 57 carries an insulating button 65. The button 65 presses against the contact spring 51. This button 65 is mounted on the end of an adjustment screw 66. The temperature adjustment shaft 57 is hollow and permits adjustment of the position of button 65 for purposes of calibration by the insertion of a screwdriver blade within the shaft 57 to engage a key slot 68 formed in the end of the adjustment screw 66. The shaft 57 is fluted at 69 for engagement with the knob 59. A guide bushing 71 is provided for the temperature adjustment shaft 57. The guide bushing 71 comprises an integrally formed collar portion 72 which fits into complementary semi-circular grooves or recesses formed in the two cover halves 15 and 16. The collar portion 72 thus secures the guide bushing 71 against axial movement.

A flexible two-conductor power cord 74 extends through a flexible rubber sleeve 75 into the interior of the control. The sleeve 75 and the power cord 74 are fixedly connected with a relatively hard rubber bushing 77. The bushing 77 comprises a collar portion 78 which is received in complementary semi-circular grooves or recesses formed in the two cover halves 15 and 16. Advantageously, the diameters of the bushings 71 and 77 and of their respective collar portions 72 and 78 are the same, thus permitting the two cover halves 15 and 16 to be of identical construction and fully interchangeable.

There are two spring-type contact or terminal members 80 and 81 each with confronting longitudinal grooves formed therein and which are adapted to receive and establish electrical contact with the prongs (not shown) mounted on the cooking vessel. These contact members 80 and 81 are of conventional type commonly used with electrical heating appliances such as electric irons and the like and are positively secured but somewhat loosely held between the cover halves 15 and 16.

One of the power cord conductors 83 is connected directly to the prong-receiving spring terminal 80. The other power cord conductor 84 is connected directly to eyelet terminal 44 by the terminal screw 45. A short conductor 86, Fig. 3, extends from the terminal screw 50 of eyelet terminal 48 to the prong-receiving spring-type contact member 81.

A neon glow lamp 87 is connected in series with a current limiting resistor 88. The series combination of the lamp 87 and resistor 88 is connected between the prong-receiving terminal 80 and terminal screw 50 so that the glow lamp 87 will be lighted whenever the circuit to the prong-receiving terminals 80 and 81 is energized for the heating element of the griddle. Transparent windows 90 are mounted in the cover halves 15 and 16 for observation of the glow lamp. The lead wires of the glow lamp 87 and resistor 88 are sufficiently rigid so that no additional supporting or mounting means is required.

The cover halves 15 and 16 comprise projections and/or indentations for securing the channel-shaped supporting member 33 and the flanged base plate 35 against movement with respect to the body 14 of the control, whereby the temperature sensitive element 20 is fixedly retained in position within the thermostatic control. Vent passages formed by opposing notches 91 in the cover sections are provided for the circulation of cooling air within the body 14.

Prior to assembly, the temperature sensitive element 20, including the channel-shaped supporting member 33, is adjusted so that the tip of the insulating button occupies a predetermined position with respect to the spaced parallel edges 40 of the channel-shaped supporting member 33 at a predetermined calibration temperature. This adjustment is effected by turning the rod 23 by means of a screwdriver blade inserted in the key slot 26. After the correct adjustment has been obtained at at least one calibration temperature, the position of the rod 23 is locked by means of the lock screw 28 and sealed by means of the drop of solder 31.

The calibrated assembly 22—23—33 is then assembled with a base plate 35, the contact springs 47 and 51 having been previously mounted on the base plate 35. The spaced parallel edges serve as reference surfaces and the bending over of the ears 36 provides a pre-calibrated assembled unit insofar as the contact spring 47 is concerned. The temperature adjustment shaft 57 is thereafter or may have previously been threaded into the boss 56 and the lug 63 bent into its position, as shown, wherein it limits movement of the stop arm 62. The adjustment screw 66 within the temperature adjustment shaft 57 is then turned until the calibrated scale 61 of knob 59 will agree with at least one calibration temperature. This may be done with a substitute scale mounted on the temperature adjustment shaft 57, so that any knob 59 of a production run of interchangeable knobs may be mounted on the temperature adjustment shaft 57.

In operation, when the temperature rises, the brass tube 22 expands longitudinally and the non-expansive rod moves with the free outer end of the tube 22. As a result, the insulating button 34 moves toward the left as viewed in Fig. 4 whereby the contacts 53 and 54 separate from each other and open the energizing circuit to the heating element. The temperature at which this separation occurs can be varied at will by manual adjustment of the knob 59, reference being had to the calibrated scale 61. When the temperature drops, the brass tube 22 contracts longitudinally and the insulating button 34 again presses the contacts 53 and 54 into engagement with each other whereby the energizing circuit for the heating element is again completed. The temperature-sensitive tube 22 is located in thermally conductive contact, or at least in close proximity to the lateral wall of the thermometer well 19. Accordingly, the control responds quickly to temperature changes without objectionable amount of thermal lag.

The control may be quickly and easily attached to or detached from the griddle 10. This permits thorough cleaning of the griddle 10 with the control removed.

While I have shown what I believe to be the best embodiment of my invention, it will be apparent to those skilled in the art that many changes and modifications may be made therein without departing from the spirit and scope of the invention as defined in the appended claims.

What is claimed is:

1. A thermostatic electrical control comprising, a body formed of electrically insulative material, switch means disposed within said body, said switch means comprising two substantially straight, parallel flexible leaf-type contact springs and two cooperating electrical contact members carried by said springs, temperature adjustment means acting on one of said springs for adjustment of the position of the contact member carried by said one spring relative to the other contact member, an elongated tubular temperature sensitive member extending outwardly beyond said body substantially at a right angle to said contact springs, said temperature sensitive member being formed of a material having a high temperature coefficient of expansion, a rod member coaxially and freely slidably disposed within said temperature sensitive member, said rod member being formed of a material having a low temperature coefficient of expansion, supporting means within said body for said switch means, means positioning one end of said temperature sensitive member fixedly with respect to said supporting means the opposite end of said tubular temperature sensitive member being internally screw threaded and the adjacent end of said rod member being externally screw threaded and adjustably engaged with said internally threaded portion of the tubular member, the opposite end of said rod member being disposed in opposition to the other of said springs and an insulating element carried by said opposite end of said rod member in direct push engagement with said other spring, and whereby the contractive and expansive movements of said tubular member will effect movement of said rod member toward and away from said other spring to thereby effect a direct push movement of said other spring toward the adjustably positioned spring.

2. The invention according to claim 1, with a lock screw entered in the screw threaded end of said tubular member in engagement with the screw threaded end portion of said rod member for securing the latter in adjusted relation in the tubular member, and a solder seal closing the end of the tubular member over said lock screw.

3. The invention according to claim 1, with said insulating body formed of companion cover members enclosing said switch means and having opposed notches opening from the exterior of said body through and around the switch means enclosed within the body.

References Cited in the file of this patent

UNITED STATES PATENTS

| 1,431,542 | Ross | Oct. 10, 1922 |
| 1,837,000 | Wertz | Dec. 15, 1931 |
| 2,498,988 | Eden et al. | Feb. 28, 1950 |
| 2,705,745 | Matthysse et al. | Apr. 5, 1955 |
| 2,755,359 | Rike | July 17, 1956 |

FOREIGN PATENTS

| 725,341 | Great Britain | Mar. 2, 1955 |